Patented May 16, 1950

2,507,944

UNITED STATES PATENT OFFICE 2,507,944

PREPARATION OF SULFURIC ESTERS OF LEUCO VAT DYES

John Taras, Alpha, N. J., assignor to General Aniline & Film Corporation, New York, N. Y., a corporation of Delaware No Drawing. Application April 29, 1947, Serial No. 744,790

7 Claims. (Cl. 260—321)

The present invention relates to the preparation of sulfuric ester salts of leuco vat dyes and more particularly to the preparation of such ester salts wherein the esterification is effected in an aqueous medium.

It is common practice at the present time to employ vat dyes in the form of their leuco ester salts rather than in the form of the simple leuco compounds. This is attributable to the fact that the leuco ester salts are much more soluble than the leuco compounds per se, a fact which facilitates the application of the reduced vat dyes to the fiber.

Generally the leuco ester salts are prepared by esterifying the leuco compounds by means of the addition products of sulfur trioxide and pyridine in the presence of an excess of the pyridine. It is usual, too, to effect esterification simultaneously with the conversion of the vat dyes to the leuco form and for this purpose there is normally employed a reaction medium comprising the vate dye to be reduced and esterified, a metallic powder such as iron powder, chlorsulfonic acid, cuprous chloride, and an excess of pyridine.

The reaction mixture in which such esterification is effected is anhydrous. This is treaceable to the general impression of the art that the addition compounds of sulfur trioxide with pyridine hydrolyze spontaneously in aqueous media and particularly in aqueous alkaline media. The impression also persisted that if the medium were strongly alkaline in many cases the addition product decomposed by splitting of the pyridine ring, as a consequence of which no esterification could possibly ensue. This fact is emphasized in Lecher et al. USP 2,403,226, who proposed to operate in an aqueous medium but while employing as the esterifying agent the addition products of sulfur trioxide with a much stronger tertiary amine than pyridine, i. e., with tertiary amines having a dissociation constant of at least $1 \times 10^{-7}$ at 25° C.

The usual method of effecting reduction and esterification of vat dyestuffs, i. e., by operating in an anhydrous medium, is not only expensive from the standpoint of the materials used but also from the difficulty involved in the conversion of the dyestuffs into the sulfuric ester salts in satisfactory yields. There has, therefore, been a very decided need in the art to find a cheaper process, particularly one which would permit the formation of the desired esters in high yields while operating in an aqueous medium, that is, while avoiding the use of large amounts of costly anhydrous solvent-diluents.

I have now discovered that contrary to the accepted notion of prior operators, leuco vat dyes can be readily converted into their ester salts in a smooth operation leading to high yields by operating in an aqueous alkaline medium and while utilizing as the esterifying agent the addition products of sulfur trioxide with a pyridine, such as, pyridine itself or α-picoline, provided, however, that care is taken to insure a proper correlation between the quantity of vat dye stuff treated with the quantity of the alkali utilized and the quantity of said addition product. Unless such correlation be maintained the conclusion reached by prior operators that esterification in an aqueous alkaline medium cannot be effected when using the addition product of sulfur trioxide with pyridine as the esterifying agent proves to be true.

It is undoubtedly correct that strong alkalies have a tendency to split addition products of pyridine and sulfur trioxide in aqueous medium. I have, for instance, repeated the work reported by Lecher at the bottom of column 1, page 3, of his aforementioned patent and have found that the method in question fails to give esterification probably because of the decomposition of the addition product. However, the deleterious action of the alkali on the addition product of pyridine with sulfur trioxide mentioned by Lecher does not manifest itself with the proper proportioning of the components as I have observed. It is rather difficult to state the particular reasons why this is so. The possibility exists that competing reactions tend to take place in the esterifying mixture involving the dyestuff, addition compound and alkali and that in the quantities used by Lecher the reaction which predominates is splitting of the addition product, whereas, with the quantities of alkali which I employ esterification is the predominating reaction. However, irrespective of the theory or reasons involved, the fact remains that by operating as subsequently described esterification of the vat dye proceeds smoothly with commercially satisfactory yields, a finding which is totally unexpected in the light of the prior art teachings.

It is, accordingly, an object of the present invention to produce sulfuric ester salts of leuco vat dyes while operating in an aqueous alkaline medium and while utilizing the addition products of sulfur trioxide and a pyridine as the esterifying agent.

A further object of the present invention is the esterification of the leuco vat dyes in an aqueous alkaline medium while utilizing the addition product of sulfur trioxide with a pyridine as the esterifying agent and while correlating the amount of the leuco vat dye with the amount of such addition product and the amount of the alkali employed.

Other and further important objects of the invention will become apparent as the description proceeds.

It will be apparent from what has been said that the crux of the invention resides in the proper correlation of the quantities of the reactants. The alkali which is used both in the vatting and in the esterification steps must be a water soluble strong inorganic alkali, such as, sodium and potassium hydroxide and the like. Such compounds must be employed in the esterification mixture in a quantity ranging from 10 to about 40 mols for each mol of the leuco compound to be esterified. However, even if the alkali be employed in such quantities it is nevertheless imperative that a proper ratio be maintained between the quantity of vat dyestuff and of sulfur trioxide addition compound. It is absolutely essential that there be used at least three mols of the addition compound for each mol of the vat dyestuff if substantial esterification is to ensue. The quantity of the addition compound generally ranges from 3 to 10 mols per mol of the vat dyestuff and preferably increases within this range as the quantity of the alkali increases. A greater quantity of the addition product than 10 mols per mol of vat dyestuff may be employed, but since such greater quantity serves no useful purpose its employment is not recommended.

It must be pointed out that irrespective of the quantity of the addition product which is employed the desired esterification cannot take place unless the proper quantity of alkali is used. Conversely, no matter what the quantity of the alkali, I have found that esterification is not possible unless the quantity of the addition product amounts to at least 3 mols per mol of vat dyestuff.

Any of the vat dyes may be esterified by my procedure, including the indigoid dyestuffs, the thioindigoid dyestuffs, the mixed indigo-thioindigo dyestuffs, indanthrenes, benzanthrones and the like.

However, the quinone vat dye intermediates, such as, the amino anthraquinones, acetylamino anthraquinones and the like, are expressly excluded since my process is ineffective with such compounds. Thus, I have attempted to esterify leuco 2-acetylamino-3-chloroanthraquinone while utilizing quantities of the reactants within the aforestated ranges. The large excess of alkali, however, prevents the formation of the desired high yields of the di-ester and, in fact, appears to cause the formation of some other compound. The term "vat dye" as used herein is, therefore, to be construed as covering quinonoid vat dyes but not intermediates for the manufacture of such dyes.

Examples of vat dyes which I have esterified by the method contemplated herein are Jade Green or bz-2-bz-2'-dimethoxy dibenzanthrone, 6.6'-diethoxy-thioindigo, indigo, 5.5'.7.7'-tetrabromindigo, pentabromindigo, 2-monobromindigo, 5.5'-dichloro-6.6'-dibromindigo, 1.1'-dichlorindigo, 6.6'-diethoxy-thioindigo, the mixed indigos described in USP 1,925,217, the vat dyes disclosed in USP 1,809,224, the indanthrene vat dyes disclosed in USP 943,717, 3.4.8.9-dibenzo-pyrene quinone, the indanthrene disclosed in USP 995,936, dibromated pyranthrone, dibrom-dimethoxy-dibenzanthrone, dichlor-isoviolanthrene and the like.

The addition product of the sulfur trioxide and pyridine or α-picoline, as the case may be, may be prepared by the usual methods. However, I have found that better results are at all times obtained if such addition product be formed by slowly adding sulfur trioxide to a cold solution of pyridine or picoline in a solvent, such as, chlorinated hydrocarbons, i. e., chloroform, carbon tetrachloride, trichloroethylene, dichlorobenzene, and the like. Equally good results are obtained when using a mixture of α-picoline and pyridine, the pyridine being employed in excess to serve as an inert diluent.

The addition product of sulfur trioxide and pyridine can also be prepared by the action of chlorosulfonic acid on pyridine while utilizing chloroform as the diluent. Under these circumstances, the sulfur trioxide addition compound separates as a white crystalline product, whereas, the pyridine hydrochloride remains dissolved in the chloroform.

My process is effected by first vatting the vat dye according to usual practice, i. e., by means of sodium hydrosulfite and an alkali and treating the so obtained leuco compound with the sulfur trioxide addition product. The latter step, which leads to the esterification of the leuco compound, is generally effected at a temperature ranging from about room temperature, i. e., 20° C. to about 50° C. After the esterification is complete, the reaction mixture is generally treated with an oxidizing agent to oxidize any slight quantities of the unesterified leuco compound. For this purpose there may be employed the sodium salt of meta-nitro-benzene-sulfonic acid. After oxidation the solution is heated in vacuo for the purpose of distilling off the pyridine. It is preferable during the entire operation to maintain the reactants in an inert atmosphere to thereby prevent premature oxidation of the leuco compound. This result may be achieved by operating in an atmosphere of nitrogen.

The following examples serve to illusrate the invention but it is to be understood that the invention is not restricted thereto. The parts are by weight unless otherwise stated.

*Example I*

15 parts of Jade Green are dissolved in a solution of 37.5 parts of potassium hydroxide,
17.5 parts of sodium hydrosulfite, and
500 parts of water.

The solution is then agitated while heating to a temperature of 70–75° C. under an atmosphere of nitrogen.

50 parts of the addition product of sulfur trioxide and pyridine are then added to the blue vat at a temperature of 35° C. The reaction mixture is agitated at 35–40° C. for two hours while excluding air. The deep blue color of the leuco vat changes rapidly to a bluish red and after about a half hour to a yellowish red. The formation of the latter color indicates that esterification of the leuco compound has been completed. This conclusion may be tested by extracting a small portion of the reaction mixture, bubbling air therethrough for a short time, and finally filtering the test sample. If there be no further green precipitate on the filter paper, then the esterification may be deemed to be complete.

The solution is now diluted to two liters by the addition of water and 2 parts of the sodium salt of meta-nitro-benzene sulfonic acid are added for the purpose of oxidizing any small quantities of the unesterified leuco compound. The solution is then heated to 45–50° C. and the pyridine removed by vacuum distillation. The solution is next filtered to remove the oxidized dyestuff which if present at all is filtered off in very small quantites, never amounting to more than 5 parts of the total dyestuff charged and in most cases much less.

The resulting colored solution is stable to any further oxidative action. It dyes wool and cotton fibers a reddish brown color which changes to the brilliant green color of the parent dyestuff when placed in a sodium nitrate bath followed by immersion in dilute mineral acid.

If it be desired to isolate the potassium salt of the leuco disulfuric acid ester, the red solution is concentrated under reduced pressure to a volume of 460 ccs. and there are added thereto a mixture of 30 parts of potassium carbinate and 30 parts of potassium chloride. The potassium salt of the disulfuric acid ester precipitates in crystalline form. The yield is nearly quantitative, ranging from 90–95 per cent. The product can be dispersed to a paste form which may be used directly for dyeing or printing by well-known methods.

The addition product of sulfur trioxide and pyridine is produced as follows:

500 parts of pyridine and
1500 parts of chloroform are cooled to 10° C.

521 parts of freshly distilled sulfur trioxide are added dropwise at 10–20° C., the end of the dropping funnel being placed beneath the surface of the solution. The mixture is agitated for one hour at 25–30° C., filtered, and the presscake washed with 200 parts of chloroform, and vacuum dried at a temperature below 50° C. There is thus obtained a white product melting at 120–121° C. and having a sulfur content of 20.14 per cent. The yield is quantitative.

The addition product of sulfur trioxide and pyridine can also be produced as follows:

A solution of 632 parts of pyridine and 2000 parts of chloroform are cooled to 0° C., and 385 parts of chlorosulfonic acid are added dropwise to the solution while maintaining a temperature below 10° C. The mixture is agitated for one-half hour at 10 to 20° C., filtered and the presscake washed with 400 parts of chloroform. The white crystalline product obtained is dried below 50° C. in a vacuum. The dry product which is obtained in excellent yields is the addition product of sulfur trioxide and pyridine. It has a sulfur content of 20.12% and melts at 120 to 121° C. The pyridine hydrochloride formed simultaneously in the reaction remains in the chloroform filtrate.

The critical nature of the quantity of reactants in the esterification mixture is very aptly demonstrated by the following comparison:

(a) The above procedure was repeated excepting that there was used 15.5 parts of Jade Green and 7.7 parts of sodium hydroxide. No esterification took place.

(b) The procedure of Example I was again repeated while using 15.5 parts of Jade Green and 10.8 parts of potassium hydroxide. Here again no esterification was effected.

(c) The procedure of Example I was again repeated while utilizing 15.5 parts of Jade Green, 37.5 parts of potassium hydroxide and 11.5 parts of the addition product of pyridine and sulfur trioxide. The conditions observed again fail to effect esterification.

(d) The procedure in Example I was repeated while utilizing 15.5 parts of Jade Green, 200 parts of water, 7.7 parts of sodium hydroxide, 7.6 parts of sodium hydrosulfite and 11.5 parts of the pyridine-sulfur trioxide addition product. The leuco vat dye again failed to esterify.

The stress that these various runs place on the necessity of correlating the quantities of the dyestuff, alkali and sulfur trioxide addition compound, is more readily observable by a consideration of the following table which lists the ingredients, quantities and results obtained in each run:

| | parts Jade Green | parts alkali | parts hydrosulfite | parts pyridine-SO$_3$ | yield of ester |
|---|---|---|---|---|---|
| | | | | | Per cent |
| (a) | 15.0 | 37.5 KOH (high) | 17.5 | 50 (high) | 97.8 |
| (b) | 15.5 | 7.7 NaOH (low) | 17.5 | 50 (high) | none |
| (c) | 15.5 | 10.8 KOH (low) | 17.5 | 50 (high) | none |
| (d) | 15.5 | 37.5 KOH (high) | 17.5 | 11.5 (low) | none |
| | 15.5 | 7.7 NaOH (low) | 7.6 | 11.5 (low) | none |

*Example II*

125 parts of Jade Green are added to a solution of 5000 parts of water
175 parts of powdered sodium hydrosulfite, and
300 parts of potassium hydroxide.

To the vat thus obtained there are added 420 parts of the sulfur trioxide addition product of α-picoline while maintaining an inert atmosphere in the reactor. The mixture is agitated for several hours at 35–40° C. The solution thus obtained is diluted with 15,000 parts of water, following which there are added 50 parts of the sodium salt of meta-nitrobenzene sulfonic acid and the mixture heated to 60° C. and filtered.

The clear red filtrate contains the disulfuric ester of leuco Jade Green, which may be isolated as such if desired by concentrating the solution under reduced pressure and salting out the dyestuff by means of potassium chloride and potassium carbonate as in Example I. The crystalline product which precipitates is separated by filtration and may be made into a paste for printing and padding. The yield is practically quantitative, ranging from 90–95 per cent. The tinctorial properties of the dyestuff compare favorably with those of established commercial brands of this product.

The addition product of sulfur trioxide and α-picoline may be obtained as follows:

1186 parts of α-picoline and
3000 parts of chloroform are cooled to 10° C. and 1000 parts of sulfur trioxide are then added while maintaining a temperature of 10–20° C. The sulfur trioxide-α-picoline addition product is isolated as described in Example I in connection with the sulfur trioxide-pyridine addition product.

*Example III*

A vat is prepared by treating 5 parts of Jade Green with a solution of
250 parts of water,
19 parts of potassium hydroxide, and
9 parts of sodium hydrosulfite.

To the clear blue vat so obtained there are added at 25° C., 30 parts of the sulfur trioxide-pyridine addition compound described in Example I. The reaction temperature is held at 25–30° C. for two hours while the reaction mixture is agitated under exclusion of air. The di-potassium salt of the disulfuric acid ester of leuco dimethoxy dibenzanthrone is thus obtained and may be isolated as described in Example I.

*Example IV*

15 parts of 6.6'-diethoxy thioindigo are vatted in a solution of 500 parts of water,
40 parts of potassium hydroxide, and
18 parts of sodium hydrosulfite.

When reduction of the vat dye is complete, there are then added to the solution 65 parts of the pyridine-sulfur trioxide complex at a temperature of 10° C. The temperature is then allowed to rise to 25–30° C. and maintained at this level for several hours. At this time, esterification is complete and any unesterified leuco compound is destroyed by oxidation with sodium-meta-nitro benzene sulfonate. The pyridine is now removed by vacuum distillation, after which the solution is filtered to yield an amber colored filtrate.

The disulfuric acid ester salt of the leuco diethoxy thioindigo may be isolated from the amber colored filtrate by salting out with a mixture of potassium chloride and potassium carbonate. The di-ester of the dyestuff may be dried by known methods after which it is ready for use in the printing and padding of vegetable fibers by acid-oxidative development methods. The dyestuff yields bright orange prints characteristic of diethoxy thioindigo.

*Example V*

25 parts of indigo are vatted in a solution of
975 parts of water
35 parts of sodium hydrosulfite and
75 parts of sodium hydroxide while maintaining an atmosphere of nitrogen. To the vat thus obtained there are added 100 parts of the addition product of pyridine and sulfur trioxide and the solution is agitated at 35–40° C. for several hours. At this point esterification is complete and the solution is diluted with 1000 parts of water.

5 parts of sodium-meta-nitro benzene sulfonate are added, the solution heated to 80° C. and filtered. The clear brown filtrate contains the disulfuric ester of leuco indigo. The ester may be isolated as such by salting out with a mixture of sodium chloride and sodium carbonate. The disodium salt is obtained in a yield of 80 per cent of theory.

The procedure was repeated while utilizing 15.7 parts of indigo, 24.2 parts of potassium hydroxide, 15.3 parts of sodium hydrosulfite and 23 parts of the pyridine-sulfur trioxide addition product. The yield of di-ester was inconsequential.

*Example VI*

25 parts of indigo are vatted as described in Example V and to the vat are added at a temperature of 35–40° C. 105 parts of the addition compound of $\alpha$-picoline and sulfur trioxide while excluding air. After oxidizing any of the unesterified leuco compound as in the above examples, vacuum distilling the $\alpha$-picoline, the solution is filtered to yield a clear amber solution containing the disulfuric acid ester of leuco indigo.

*Example VII*

25 parts of 5.5'.7.7'-tetrabromindigo are vatted in a solution of 1000 parts of water
35 parts of sodium hydrosulfite and
90 parts of sodium hydroxide.

To the vat thus obtained there are added 100 parts of the addition product of pyridine and sulfur trioxide and the solution is agitated for several hours at 35–40° C. while excluding air. The solution is next diluted with 1000 parts of water and thereto are added 5 parts of sodium metanitro-benzene sulfonate. After removing the pyridine by vacuum distillation at 60° C., the solution is filtered to yield an amber colored solution containing the disulfuric acid ester of leuco tetrabrom indigo. The sodium salt of the ester may be isolated by concentrating the solution under reduced pressure and salting out by the gradual addition of soda ash and sodium sulfate.

The procedure was repeated while utilizing 34.6 parts of the tetrabrom indigo, 17.3 parts of sodium hydroxide, 15.3 parts of sodium hydrosulfite and 23 parts of the pyridine-sulfur trioxide addition product. In this case no esterification took place.

*Example VIII*

A vat is prepared as described in Example VII from 25 parts of 5.5'.7.7'-tetrabrom indigo. When reduction is complete, i. e., when the blue color of the dyestuff disappears completely, 100 parts of the sulfur trioxide addition product of $\alpha$-picoline are added and the solution agitated for several hours at 35–40° C. in an atmosphere of nitrogen. After oxidation of any of the unesterified leuco compound and distillation of the $\alpha$-picoline, the amber colored solution is filtered. The disulfuric acid ester of leuco tetrabrom indigo may be obtained therefrom in the form of its sodium salt by concentrating the solution under reduced pressure and salting out with sodium sulfate.

*Example IX*

The procedure is the same as in Example I excepting that there are used 30 parts of Jade Green
75 parts of potassium hydroxide
35 parts of sodium hydrosulfite and 100 parts of the addition product of sulfur trioxide and pyridine. The yield is 97.8 per cent of theory.

*Example X*

The procedure is the same as in Example I excepting that there are used 15 parts of Jade Green
30 parts of potassium hydroxide
13.3 parts of sodium hydrosulfite and 45 parts of the addition product of pyridine and sulfur trioxide. The yield is 95.3 per cent of theory.

*Example XI*

The procedure is the same as in Example I excepting that there are used 15 parts of Jade Green
26.6 parts of potassium hydroxide
11.6 parts of sodium hydrosulfite and 43.3 parts of the addition product of pyridine and sulfur trioxide. The yield is 99.7 per cent of theory.

Example XII

The procedure is the same as in Example I excepting that there are used 15 parts of Jade Green
23.3 parts of potassium hydroxide
10 parts of sodium hydrosulfite, and 40 parts of the addition product of sulfur trioxide and pyridine. The yield is 85.3 per cent of theory.

Example XIII

The procedure is the same as in Example VII, excepting that there are used 30 parts of the tetrabrom indigo
60 parts of potassium hydroxide
30 parts of sodium hydrosulfite 90 parts of the addition product of pyridine and sulfur trioxide. The yield was 97.2 per cent of theory.

Example XIV

The procedure was the same as in Example VII excepting that there were used 15 parts of the tetrabrom indigo
30 parts of potassium hydroxide
15 parts of sodium hydrosulfite and 45 parts of the addition product of sulfur trioxide and pyridine. The yield was 97.9 per cent of theory.

Example XV

The procedure is the same as in Example VII excepting that threre are used 15.7 parts of the tetrabrom indigo
35 parts of potassium hydroxide
17 parts of sodium hydrosulfite and 50 parts of the addition product of pyridine and sulfur trioxide. The yield was 83.7 per cent of theory.

Example XVI

The procedure is the same as in Example V excepting that there were used 62.8 parts of indigo
140 parts of potassium hydroxide
68 parts of sodium hydrosulfite 200 parts of the addition product of sulfur trioxide and pyridine. The yield was 81.8 per cent of theory

Example XVII

The procedure is the same as in Example V excepting that there were used 62.8 parts of indigo
100 parts of sodium hydroxide
68 parts of sodium hydrosulfite, and 200 parts of the addition product of sulfur trioxide and pyridine. The yield of di-ester was 97% of theory.

Various modifications of the invention will occur to persons skilled in the art and I, accordingly, do not intend to be limited in the patent granted except as necessitated by the prior art and the appended claims.

I claim:

1. A process for the production of water-soluble sulfuric ester salts of leuco vat dyes by reacting a leuco vat dye with the sulfur trioxide addition compound of a tertiary amine selected from the class consisting of pyridine and a-picoline which consists in adding said addition compound in the form of a preformed solid to a solution consisting of an aqueous alkaline solution of said leuco compound in which the alkali is a strong inorganic alkali while employing for each molecule of the leuco vat dye from 10 to about 40 mols of alkali and at least 3 mols of said sulfur trioxide addition compound and agitating the solution at a temperature ranging from about 20 to about 50° C.

2. The process as defined in claim 1 wherein the sulfur trioxide addition product is the sulfur trioxide addition product of pyridine.

3. The process as defined in claim 1 wherein the leuco vat dye is a leuco indigoid.

4. The process as defined in claim 1 wherein the leuco vat dye is that from Jade Green.

5. The process as defined in claim 1 wherein the leuco vat dy is that from tetrabrom indigo.

6. The process as defined in claim 1 wherein the sulfur trioxide addition product is the sulfur trioxide addition product of α-picoline.

7. The process as defined in claim 1 wherein the quantity of addition product employed is greater the greater the quantity of alkali.

JOHN TARAS.

REFERENCES CITED

The following references are of record in the file of this patent:

FOREIGN PATENTS

| Number | Country | Date |
| --- | --- | --- |
| 271,533 | Great Britain | Jan. 21, 1926 |

Certificate of Correction

Patent No. 2,507,944 May 16, 1950

JOHN TARAS

It is hereby certified that errors appear in the printed specification of the above numbered patent requiring correction as follows:

Column 5, line 13, for the word "nitrate" read *nitrite*; line 19, for "carbinate" read *carbonate*; column 10, lines 21 and 22, for "a-picoline" read *α-picoline*;

and that the said Letters Patent should be read with these corrections therein that the same may conform to the record of the case in the Patent Office.

Signed and sealed this 1st day of August, A. D. 1950.

[SEAL]

THOMAS F. MURPHY,
*Assistant Commissioner of Patents.*